(12) United States Patent
Someya et al.

(10) Patent No.: US 12,169,300 B2
(45) Date of Patent: Dec. 17, 2024

(54) LIGHT GUIDING PANEL AND IMAGE DISPLAY DEVICE

(71) Applicant: AGC Inc., Tokyo (JP)

(72) Inventors: Takenori Someya, Tokyo (JP); Tomoaki Sakurada, Tokyo (JP)

(73) Assignee: AGC Inc., Tokyo (JP)

( * ) Notice: Subject to any disclaimer, the term of this patent is extended or adjusted under 35 U.S.C. 154(b) by 197 days.

(21) Appl. No.: 17/816,185

(22) Filed: Jul. 29, 2022

(65) Prior Publication Data

US 2022/0365270 A1 Nov. 17, 2022

Related U.S. Application Data

(63) Continuation of application No. PCT/JP2021/006497, filed on Feb. 19, 2021.

(30) Foreign Application Priority Data

Feb. 26, 2020 (JP) .................................. 2020-030808

(51) Int. Cl.
*F21V 8/00* (2006.01)
*C03C 3/068* (2006.01)
(Continued)

(52) U.S. Cl.
CPC ............ *G02B 6/0065* (2013.01); *C03C 3/068* (2013.01); *C03C 3/097* (2013.01); *C03C 3/19* (2013.01); *C03C 17/009* (2013.01); *C03C 17/32* (2013.01); *G02B 6/0016* (2013.01); *G02B 6/0035* (2013.01); *G02B 27/0172* (2013.01);
(Continued)

(58) Field of Classification Search
CPC ............... G02B 6/0016; G02B 6/0035; G02B 6/0065; G02B 27/0172; G02B 2027/0123; C03C 3/068; C03C 3/097; C03C 3/19; C03C 17/009; C03C 17/32; C03C 2217/445; C03C 2217/475; C03C 2217/477; C03C 2217/48
See application file for complete search history.

(56) References Cited

U.S. PATENT DOCUMENTS

2017/0184894 A1 6/2017 Hayashi et al.
2018/0029319 A1 2/2018 Kalima et al.
(Continued)

FOREIGN PATENT DOCUMENTS

CN 107003435 A * 8/2017 ............. B32B 27/08
CN 109270624 A 1/2019
(Continued)

OTHER PUBLICATIONS

International Search Report issued May 11, 2021 in PCT/JP2021/006497, filed on Feb. 19, 2021, 3 pages.

*Primary Examiner* — Daniel Petkovsek
(74) *Attorney, Agent, or Firm* — Oblon, McClelland, Maier & Neustadt, L.L.P.

(57) ABSTRACT

The present invention relates to a light guide plate containing a glass plate and a resin layer that is formed on at least one major surface of the glass plate, in which the resin layer is made of a resin containing metal oxide fine particles dispersed, and an absolute value of a refractive index difference between the glass plate and the resin layer is 0.07 or smaller over an entire range of a wavelength of 430 nm to 700 nm.

20 Claims, 2 Drawing Sheets

(51) Int. Cl.
    *C03C 3/097*     (2006.01)
    *C03C 3/19*     (2006.01)
    *C03C 17/00*     (2006.01)
    *C03C 17/32*     (2006.01)
    *G02B 27/01*     (2006.01)

(52) U.S. Cl.
    CPC ............ *C03C 2217/445* (2013.01); *C03C 2217/475* (2013.01); *C03C 2217/477* (2013.01); *C03C 2217/48* (2013.01); *G02B 2027/0123* (2013.01)

(56) References Cited

U.S. PATENT DOCUMENTS

| | | |
|---|---|---|
| 2018/0031840 A1 | 2/2018 | Hofmann et al. |
| 2019/0204497 A1* | 7/2019 | Jeon .................... G02B 6/0035 |
| 2019/0331921 A1 | 10/2019 | Suzuki et al. |
| 2020/0166688 A1 | 5/2020 | Yan et al. |
| 2020/0278483 A1 | 9/2020 | Amma et al. |

FOREIGN PATENT DOCUMENTS

| | | | |
|---|---|---|---|
| JP | 2005-131917 A | | 5/2005 |
| JP | 2017-120311 A | | 7/2017 |
| JP | 2018-506743 A | | 3/2018 |
| WO | WO 2018/135193 A1 | | 7/2018 |
| WO | WO 2019/102754 A1 | | 5/2019 |

\* cited by examiner

LIGHT GUIDING PANEL AND IMAGE DISPLAY DEVICE

CROSS-REFERENCE TO RELATED APPLICATIONS

This is a continuation of International Application No. PCT/JP2021/006497 filed on Feb. 19, 2021, and claims priority from Japanese Patent Application No. 2020-030808 filed on Feb. 26, 2020, the entire content of which is incorporated herein by reference.

TECHNICAL FIELD

The present invention relates to a light guide plate and a video display device that is equipped with the light guide plate.

BACKGROUND ART

Techniques relating to head mount displays (HMDs) that use a hologram element or a diffraction optical element have been known. HMDs allow a user to observe an image light by guiding, to a prescribed optical path, the image light that is emitted from an image forming device such as a projector using the element as mentioned above.

For example, Patent document 1 discloses, as a diffraction optical element, a light guide plate that consists of a substrate made of a resin material and a flattening film that is formed on a surface of the substrate and containing an organic material.

However, the angle of view is restricted because resin is generally low in refractive index. Thus, to obtain a light guide plate having a wider angle of view, one method would be using a high reflective index material.

Patent document 1: WO 2018/135193

SUMMARY OF INVENTION

An example material having a higher refractive index than resin is glass. Because of its high refractive index, a glass plate makes it possible to obtain a wide angle of view when it is used as a substrate of a light guide plate for an HMD. In this case, a hologram element or a diffraction optical element is formed in a resin layer with which a surface of the glass plate is coated.

A person who wears an HMD views an external scene as transmission light that is transmitted through a light guide plate. However, this is associated with a problem that colors are changed, that is, deviated from original color tones, during that course. The present inventors have studied this phenomenon diligently. As a result, they found that the change in colors of transmission light thorough a light guide plate is caused by occurrence of a transmittance variation called a ripple in the transmittance spectrum of transmission light that results from light interference in the resin film because of a large refractive index difference between the glass plate and the resin layer in a visible range.

An object of the present invention is therefore to provide a light guide plate that is made up of a glass plate having a resin layer and is small in color changes in transmission light that is viewed by a person who wears a video display device such as an HMD that uses the light guide plate.

As for the refractive index difference between the glass plate and the resin layer, the refractive index of the resin layer can be increased so as to come closer to the refractive index of the glass plate by dispersing metal oxide fine particles in the resin. However, the wavelength dispersibility of the refractive index varies from one material to another and a ripple as mentioned above occurs if a wavelength range having a large refractive index difference exists. Thus, the problem of color changes cannot be solved completely merely by increasing the refractive index of the resin layer. The present inventors found out that the refractive index difference between the glass plate and the resin layer can be reduced over the entire visible range by properly selecting a glass composition and a kind of metal oxide fine particles to be dispersed in the resin, to thereby solve this problem. The present inventors have completed the present invention based on this finding.

That is, the present invention relates to the following items [1] to [9]:

[1] A light guide plate containing a glass plate and a resin layer that is formed on at least one major surface of the glass plate, in which the resin layer is made of a resin containing metal oxide fine particles dispersed, and an absolute value of a refractive index difference between the glass plate and the resin layer is 0.07 or smaller over an entire range of a wavelength of 430 nm to 700 nm.

[2] The light guide plate according to item [1], in which a difference between a maximum value and a minimum value of normal transmittance is 3.5% or smaller over the entire range of a wavelength of 430 nm to 700 nm.

[3] The light guide plate according to item [1] or [2], in which the glass plate has a d-line refractive index $n_d(G)$ of 1.65 or larger and the resin layer has a d-line refractive index $n_d(R)$ of 1.65 or larger.

[4] The light guide plate according to any one of items [1] to [3], in which the glass plate has a glass composition that satisfies, in mol % in terms of oxides, a relationship $\{(La_2O_3+Gd_2O_3+Y_2O_3+ZrO_2+Ta_2O_5)/(La_2O_3+Gd_2O_3+Y_2O_3+ZrO_2+Ta_2O_5+WO_3+Nb_2O_5+TiO_2+Bi_2O_3)\} > 0.1$, and the metal oxide fine particles contain at least one kind selected from the group consisting of lanthanum oxide, gadolinium oxide, yttrium oxide, zirconium oxide, tantalum oxide, and hafnium oxide.

[5] The light guide plate according to any one of items [1] to [4], in which the glass plate has a glass composition that satisfies, in mol % in terms of oxides, a relationship $\{(TiO_2+Bi_2O_3)/(La_2O_3+Gd_2O_3+Y_2O_3+ZrO_2+Ta_2O_5+WO_3+Nb_2O_5+TiO_2+Bi_2O_3)\} > 0.1$, and the metal oxide fine particles contain at least one kind selected from the group consisting of titanium oxide and bismuth oxide.

[6] The light guide plate according to any one of items [1] to [5], in which the resin layer has a thickness d of 80 nm or larger.

[7] The light guide plate according to any one of items [1] to [6], in which the resin includes at least one kind selected from the group consisting of an ultraviolet-curable resin and a thermosetting resin.

[8] The light guide plate according to any one of items [1] to [7], in which the resin layer has at least one kind of structure selected from the group consisting of a lens, a lens array, and a diffraction portion.

[9] A video display device containing the light guide plate according to any one of items [1] to [8].

The present invention can make the refractive index difference between a glass plate and a resin layer smaller over at least the entire visible wavelength range. As a result, the present invention can provide a light guide plate that is small in color changes in transmission light that is viewed by a person who wears a video display device, in particular, an HMD for AR (augmented reality), that uses the light guide plate. Furthermore, a wide angle of view can be realized because the whole light guide plate is high in refractive index.

DESCRIPTION OF EMBODIMENTS

Figure 1:
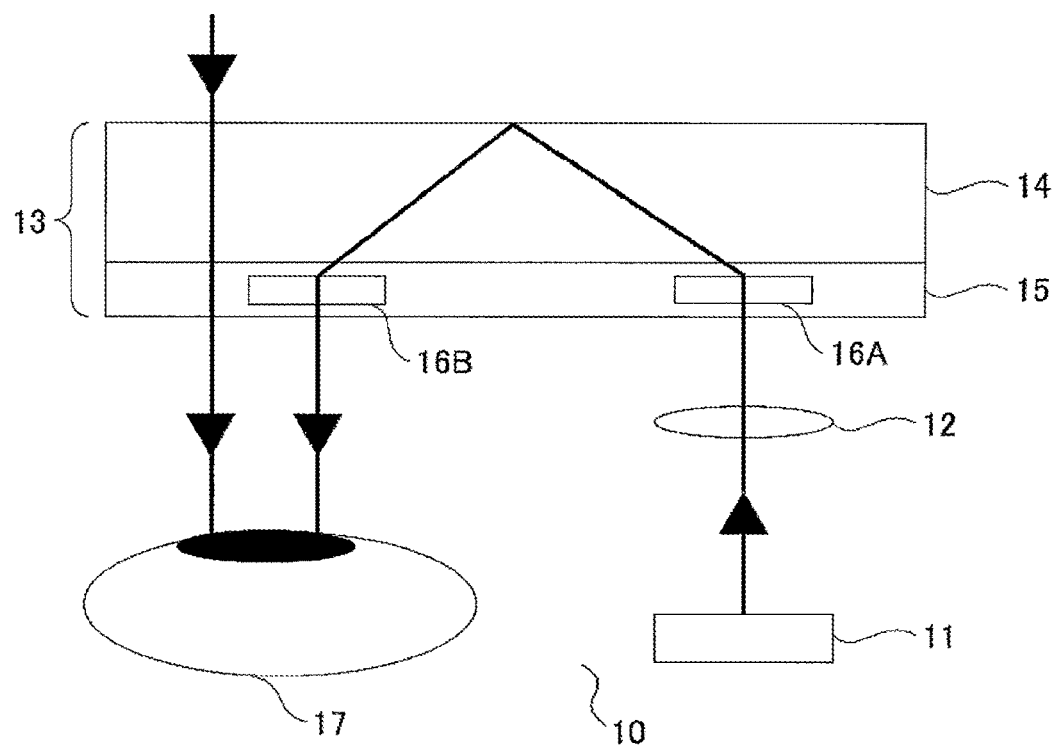
FIG. 1 is a schematic diagram illustrating an example of a video display device that is equipped with a light guide plate according to an embodiment.

Although the present invention will be hereinafter described in detail, the present invention is not limited to embodiments described below and can be implemented with desired modifications without departing from the spirit and scope of the invention. The symbol "-" (or the word "to") indicating a numerical range is used to mean to include the numerical values written before and after it as a lower limit value and an upper limit value, respectively.

Contents of respective components of a glass composition will be expressed in mol % in terms of oxides unless otherwise specified.

[Light Guide Plate]

A light guide plate according to the embodiment includes a glass plate and a resin layer that is formed on at least one major surface of the glass plate. The resin layer is made of a resin in which metal oxide fine particles are dispersed.

The absolute value of a refractive index difference between the glass plate and the resin layer is 0.07 or smaller over the entire range of a wavelength of 430 nm to 700 nm.

The refractive index can be measured by a critical angle method, a V-block method, a prism coupler method, an ellipsometry method, or the like.

In this specification, $n_d$ represents a refractive index of d-line (wavelength: 587.57 nm).

The expression "the absolute value of a refractive index difference between the glass plate and the resin layer is 0.07 or smaller over the entire range of a wavelength of 430 nm to 700 nm" is the same in meaning as an expression "the maximum value of the absolute value of the refractive index difference in this range is 0.07 or smaller." Either of the refractive index of the glass plate and that of the resin layer may be higher in this range. The magnitude relationship may be reversed depending on the wavelength.

The absolute value of the refractive index difference is preferably 0.05 or smaller, even preferably 0.03 or smaller, and further preferably 0.02 or smaller; it is more preferable as closer to 0.

The condition that the absolute value of the refractive index difference is 0.07 or smaller should be satisfied over the entire range of a wavelength of 430 nm to 700 nm. This condition is preferably satisfied over the entire range of a wavelength of 430 nm to 750 nm, even preferably over the entire range of a wavelength of 400 nm to 750 nm or a wavelength of 430 nm to 800 nm, and further preferably over the entire range of a wavelength of 400 nm to 800 nm.

Wavelengths corresponding to blue (B) and red (R) in the RGB color system are 435.8 nm and 700 nm, respectively.

In each of the above wavelength ranges, the absolute value of the refractive index difference is preferably 0.05 or smaller, even preferably 0.03 or smaller, and further preferably 0.02 or smaller; it is more preferable as closer to 0.

As the refractive index of the light guide plate becomes higher, the angle of view of an HMD that employs the light guide plate increases accordingly, which is preferable. Since the angle of view of an HMD is restricted by a lower one of the refractive indices of the resin layer and the glass plate that constitute the light guide plate, it is preferable that the refractive indices $n_d$ of both of the resin layer and the glass plate be 1.65 or higher, even preferably 1.68 or higher, further preferably 1.70 or higher, and particularly preferably 1.75 or higher.

From the viewpoint of making the light guide plate exhibit small color changes in transmission light, the difference between a maximum value and a minimum value of the normal transmittance of the light guide plate is preferably 3.5% or smaller, even preferably 3% or smaller, further preferably 2.5% or smaller, and particularly preferably 2% or smaller over the entire range of a wavelength of 430 nm to 700 nm; it is more preferable as closer to 0.

In this specification, the term "normal transmittance" (hereinafter may be referred to simply as "transmittance") means transmittance of light that is incident on a major surface of the light guide plate perpendicularly.

Whereas it is preferable that the difference between a maximum value and a minimum value of the normal transmittance of the light guide plate be 3.5% or smaller over the entire range of the wavelength range of 430 nm to 700 nm, it is even preferable that this condition be satisfied over the entire range of a wavelength of 430 nm to 750 nm, further preferably over the entire range of a wavelength of 400 nm to 750 nm or 430 nm to 800 nm, and even further preferably over the entire range of a wavelength of 400 nm to 800 nm.

In each of the above wavelength ranges, the difference between a maximum value and a minimum value of the transmittance of the light guide plate is even preferably 3% or smaller, further preferably 2.5% or smaller, and particularly preferably 2% or smaller; it is more preferable as closer to 0.

From the viewpoint of high visibility when it is used in a video display device, the haze value of the light guide plate is preferably 1% or smaller, even preferably 0.5% or smaller, and further preferably 0.3% or smaller; it is more preferable as closer to 0. In this specification, the haze value is a value that is measured by using a haze meter in accordance with JIS K 7136: 2000.

(Resin Layer)

The resin layer employed in the embodiment is made of a resin in which metal oxide fine particles are dispersed. The refractive index of the resin layer is increased as a result of the dispersion of the metal oxide fine particles.

From the viewpoint of increasing the refractive index of the light guide plate to increase the angle of view when it is used in an HMD, the d-line refractive index $n_d(R)$ of the resin layer is preferably 1.65 or larger, even preferably 1.68 or larger, further preferably 1.70 or larger, and particularly preferably 1.75 or larger. Although there are no particular limitations on the upper limit, the d-line refractive index $n_d(R)$ is usually 2.5 or smaller.

An Abbe number is calculated according to an equation $v_d = (n_d - 1)/(n_F - n_C)$ using refractive indices $n_d$, $n_F$, and $n_C$ for the d line (wavelength: 587.56 nm), the F line (wavelength: 486.13 nm), and the C line (wavelength: 656.27 nm). To decrease the difference from the refractive index of the glass plate, the Abbe number of the resin layer is preferably 10 or larger, and even preferably 15 or larger. The Abbe number of the resin layer is preferably 70 or smaller, even preferably 65 or smaller, and further preferably 60 or smaller.

The metal oxide particles are preferably small so as not to cause light scattering. From the viewpoint of preventing the haze value of the light guide plate from becoming too large, the particle diameter of the metal oxide fine particles is preferably 100 nm or smaller, even preferably 70 nm or smaller, further preferably 50 nm or smaller, and particularly preferably 30 nm or smaller. Although there are no particular limitations on the lower limit, the particle diameter of the metal oxide fine particles is preferably 5 nm or larger from a reason relating to its synthesis.

In this specification, the particle diameter of the metal oxide fine particles is a D50 value measured by a Microtrac method (laser diffraction and scattering method).

To increase dispersibility in a solvent, an organic binder or the like, the surfaces of the metal oxide fine particles may be coated with an organic compound. The organic compound to be used for the coating preferably has a portion to bond with the oxide fine particles. Examples of the potion to bond with the oxide fine particles include a silanol group, an amino group, a carboxy group, an epoxy group, and the like. The organic compound to be used for the coating may have, in addition to the portion to bond with the oxide fine particles, an aromatic ring such as a phenyl group, a biphenyl group and a naphthyl group, an alkylene group having a carbon number of 1 to 10, a methacryloyl group, an acryloyl group, an epoxy group, an amino group, a thiol group, a hydroxyl group, or the like.

It is preferable that the metal oxide fine particles be selected depending on a glass composition of the glass plate.

For example, in the case where the glass plate contains, at a large proportion, components that decrease the wavelength dispersibility of its refractive index, it is preferable that the metal oxide fine particles that are low in the wavelength dispersibility of their refractive index be dispersed in the resin. More specifically, in the case where refractive index-increasing components of the glass composition contain, at a large proportion, components that are low in the wavelength dispersibility such as a rare earth element oxide (e.g., $La_2O_3$, $Gd_2O_3$, $Y_2O_3$, etc.), $ZrO_2$ and $Ta_2O_5$, preferable examples of the metal oxide fine particles to be dispersed in the resin include lanthanum oxide, gadolinium oxide, yttrium oxide, zirconium oxide, tantalum oxide, hafnium oxide, and the like.

More specifically, in the case where the glass plate has a glass composition (described later) that satisfies, in mol % in terms of oxides, a relationship $\{(La_2O_3+Gd_2O_3+Y_2O_3+ZrO_2+Ta_2O_5)/(La_2O_3+Gd_2O_3+Y_2O_3+ZrO_2+Ta_2O_5+WO_3+Nb_2O_5+TiO_2+Bi_2O_3)\}>0.1$, it is preferable that the metal oxide fine particles contain at least one kind selected from the group consisting of lanthanum oxide, gadolinium oxide, yttrium oxide, zirconium oxide, tantalum oxide, and hafnium oxide. The components in the denominator in the above inequality are refractive index-increasing components for increasing the refractive index of the glass plate.

The metal oxide fine particles preferably include fine particles of zirconium oxide among the above kinds because they can be acquired at a relatively low price.

On the other hand, in the case where the glass plate contains, at a large proportion, components that increase the wavelength dispersibility of its refractive index, it is preferable that the metal oxide fine particles that are high in the wavelength dispersibility of their refractive index be dispersed in the resin. More specifically, in the case where refractive index-increasing components of the glass composition contain, at a large proportion, components that are high in the wavelength dispersibility such as $TiO_2$ and $Bi_2O_3$, preferable examples of the metal oxide fine particles to be dispersed in the resin include titanium oxide and bismuth oxide.

More specifically, in the case where the glass plate has a glass composition (described later) that satisfies, in mol % in terms of oxides, a relationship $\{(TiO_2+Bi_2O_3)/(La_2O_3+Gd_2O_3+Y_2O_3+ZrO_2+Ta_2O_5+WO_3+Nb_2O_5+TiO_2+Bi_2O_3)\}>0.1$, it is preferable that the metal oxide fine particles contain at least one of titanium oxide and bismuth oxide. The components in the denominator in the above inequality are refractive index-increasing components for increasing the refractive index of the glass plate.

The metal oxide fine particles preferably include fine particles of titanium oxide among the above kinds because they can be acquired at a relatively low price.

There are no particular limitations on the resin that is a material of the resin layer. Examples thereof include an acrylic resin, an epoxy resin, a silicone resin, a methyl methacrylate-styrene copolymer resin (MS resin), a cycloolefin polymer (COP), a polyethylene terephthalate (PET), a polycarbonate (PC), and a polyimide. Among these examples, from the viewpoint of avoiding transmittance reduction, use of an acrylic resin or a silicone resin is preferable. From the viewpoint of heat resistance, use of a resin having a small thermal expansion coefficient is preferable. It is preferable that, for example, at least one of a thermosetting resin and an ultraviolet-curable resin be contained as such a resin. Specifically, a thermosetting or ultraviolet-curable acrylic resin, a thermosetting or ultraviolet-curable silicone resin, a thermosetting or ultraviolet-curable polyimide, or the like can be used preferably.

From the viewpoint of increasing the refractive index, the content of the metal oxide fine particles included in the resin layer is preferably 20 mass % or higher, even preferably 30 mass % or higher, and further preferably 40 mass % or higher. From the viewpoint of formability and moldability, the content of the metal oxide fine particles is preferably 95% or lower, even preferably 93% or lower, and further preferably 90% or lower.

The resin layer may contain, in addition to the resin and the metal oxide fine particles, another, optional component in such ranges that the advantages of the present invention are not impaired. Examples of the other optional component include a surfactant, an antioxidant, a thixotropic agent, an antifoaming agent, an antigelling agent, a photosensitizer, a silane coupling agent, other organic compounds, and the like. From the viewpoint of avoiding reduction in the refractive index or transmittance of the resin layer, the total content of these optional components is preferably 5 mass % or lower, and even preferably 3 mass % or lower.

In the case where the resin layer has a structure of diffraction portion, to prevent the resin layer from becoming prone to peel off from the glass plate in a process of forming the diffraction portion, the thickness d of the resin layer is preferably 80 nm or larger, even preferably 100 nm or larger, and particularly preferably 500 nm or larger. To prevent a phenomenon that image light propagating through the light guide plate is scattered by the resin included in the resin layer to blur or darken a resulting image, the thickness d of the resin layer is preferably 7,000 nm or smaller, even preferably 5,000 nm or smaller, further preferably 1,500 nm or smaller, and particularly preferably 1,100 nm or smaller.

It is preferable that the resin layer have at least one kind of structure selected from the group consisting of a lens, a lens array, and a diffraction portion, and further preferable that the resin layer has a structure of a diffraction portion.

For the resin layer to "have a structure of a diffraction portion," it suffices that the resin layer have such a structure as to exhibit a desired diffraction action; there are no particular limitations on the specific structure. For example, the structure may be a diffraction optical element which causes diffraction action by periodic unevenness or a volume hologram element which causes diffraction action by refractive index modulation.

In a light guide plate for a video display device, it is preferable that at least a part of the resin layer function as a diffraction portion. It is even preferable that such a diffraction portion be at least one of an input diffraction grating portion and an output diffraction grating portion. It is further preferable that such a diffraction portion be both of an input diffraction grating portion and an output diffraction grating portion.

The resin layer may be formed on either a light source-side major surface of the glass plate or a major surface that is opposite to the light source-side, or on both of the major surfaces. The resin layer may be formed in at least a part of the region of such a major surface. The light source means a light source that is installed so as to irradiate the light guide plate with light.

There are no particular limitations on the number of diffraction portions formed of the resin layer; for example, a structure having one input diffraction grating portion or one output diffraction grating portion, a structure having plural input diffraction grating portions or plural output diffraction grating portions, a structure having one input diffraction grating portion and one output diffraction grating portion, and a structure having plural input diffraction grating portions and plural output diffraction grating portions are conceivable, can be employed. In the case where plural diffraction portions are provided, they may be stacked at the same position on a major surface of the glass plate.

The diffraction portion functions as a transmission type one or a reflection type one depending on the position where the resin layer is formed.

In the case where the resin layer functions as a diffraction portion and its structure is a diffraction grating (diffraction optical element), the surface of the resin layer may be formed with unevenness for exhibiting diffraction action; for example, such unevenness is formed by a method of forming a resin layer on the glass plate and pressing a die against the resin layer (nanoimprinting).

A shape of the unevenness to be formed is determined by, for example, a calculation on the basis of necessary diffraction action. Since the resulting diffraction action may be weak in the case where the height difference between bumps and dips is small, the height difference is preferably 30 nm or larger, even preferably 50 nm or larger, and further preferably 70 nm or larger. In the case where the height difference between bumps and dips is too large, the shapes of the unevenness may change due to its own weight. Thus, the height difference is preferably 1,000 nm or smaller and even preferably 700 nm or smaller.

In the case where the resin layer functions as a diffraction portion and its structure is a volume hologram structure, the diffraction portion is a refractive-index-modulated resin layer. In this case, a transmittance and a refractive index in a region where the diffraction portion is not formed are used as the normal transmittance and the refractive index of the light guide plate, respectively.

The refractive index modulation amount of the resin layer is adjusted as appropriate according to desired characteristics, an adjustment method can be a conventional one.

(Glass Plate)

Since the glass plate employed in the embodiment is higher in refractive index than common resins in which no metal oxide fine particles are dispersed, a wide angle of view can be obtained when the light guide plate is used in an HMD.

From the viewpoint of increasing the refractive index of the light guide plate, the d-line refractive index $n_d(G)$ of the glass plate is preferably 1.65 or larger, even preferably 1.68 or larger, further preferably 1.70 or larger, and particularly preferably 1.75 or larger. There are no particular limitations on the upper limit. Although it suffices that the absolute value of the refractive index difference from the resin layer be in the above-mentioned range, the d-line refractive index $n_d(G)$ of the glass plate is usually 2.5 or smaller.

To obtain a stable glass plate that hardly crystallizes, the Abbe number of the glass plate is preferably 10 or larger, and even preferably 15 or larger. On the other hand, the Abbe number of the glass plate is preferably 70 or smaller, even preferably 65 or smaller, and further preferably 60 or smaller.

Although the glass composition of the glass plate depends on the kind of metal oxide fine particles included in the resin layer, compositions similar to ones that are commonly used in glass used for video display devices can be used preferably.

It is preferable that a glass composition include, as components forming a glass framework, at least one kind selected from the group consisting of silicon oxide ($SiO_2$), boron oxide ($B_2O_3$), and phosphorus oxide ($P_2O_5$). The total content of these components is preferably 10 mol % or higher, even preferably 20 mol % or higher, and further preferably 30 mol % or higher. From the viewpoint of increasing the refractive index, the total content of these components is preferably 80 mol % or lower, and further preferably 75 mol % or lower.

The glass composition preferably contains a refractive index-increasing component(s) for increasing the refractive index of the glass plate. More specifically, the glass composition preferably contains at least one kind selected from the group consisting of $La_2O_3$, $Gd_2O_3$, $Y_2O_3$, $ZrO_2$, $Ta_2O_5$, $WO_3$, $Nb_2O_5$, $TiO_2$, and $Bi_2O_3$. The total content of these components is preferably 10 mol % or higher and even preferably 20 mol % or higher. If the content of refractive index-increasing components is too high, a stable glass plate cannot be obtained because of an increased tendency toward crystallization. Thus, the total content of these components is preferably 80 mol % or lower and even preferably 70 mol % or lower.

It is preferable to select specific refractive index-increasing components depending on the metal oxide fine particles included in the resin layer.

More specifically, in the case where the metal oxide fine particles contain components that are low in the wavelength dispersibility of their refractive index, the glass composition preferably contains at least one kind selected from the group consisting of $La_2O_3$, $Gd_2O_3$, $Y_{2O3}$, $ZrO_2$, and $Ta_2O_5$. The ratio of the total content of these components to the total content of $La_2O_3$, $Gd_2O_3$, $Y_2O_3$, $ZrO_2$, $Ta_2O_5$, $WO_3$, $Nb_2O_5$, $TiO_2$, and $Bi_2O_3$ which are refractive index-increasing components is preferably larger than 0.1 (10%), even preferably 0.12 (12%) or larger, and further preferably 0.3 (30%) or larger. The upper limit may be 1 (100%).

In the case where the metal oxide fine particles contain components that are high in the wavelength dispersibility of their refractive index, the glass composition preferably contains at least one kind selected from $TiO_2$ and $Bi_2O_3$. The ratio of the total content of these components to the total content of $La_2O_3$, $Gd_2O_3$, $Y_2O_3$, $ZrO_2$, $Ta_2O_5$, $W_{O3}$, $Nb_2O_5$, $TiO_2$, and $Bi_2O_3$ which are refractive index-increasing components is preferably larger than 0.1 (10%), even preferably 0.15 (15%) or larger, and further preferably 0.2 (20%) or larger. The upper limit may be 1 (100%).

Both of the ratios of the total content of $La_2O_3$, $Gd_2O_3$, $Y_2O_3$, $ZrO_2$, and $Ta_2O_5$ and the total content of $TiO_2$ and $Bi_2O_3$ to the total content of $La_2O_3$, $Gd_2O_3$, $Y_{2O3}$, $ZrO_2$, $Ta_2O_5$, $WO_3$, $Nb_2O_5$, $TiO_2$, and $Bi_2O_3$ may be larger than 0.1 (10%).

The glass plate may contain another, optional component in such a range that the advantages of the present invention are not impaired. Examples of the other optional components include an alkali metal oxide, an alkali earth metal oxide, ZnO, and the like.

In the case where the glass plate contains an alkali metal oxide, it preferably contains at least one kind selected from $Li_2O$, $Na_2O$, and $K_2O$. From the viewpoint of increasing the solubility of glass materials, the total content of $Li_2O$, $Na_2O$, and $K_2O$ is preferably 1% or higher, even preferably 5% or higher, and further preferably 10% or higher.

In the case where the glass plate contains an alkali earth metal oxide, it preferably contains at least one kind selected from MgO, CaO, SrO, and BaO. From the viewpoint of increasing the solubility of glass materials, the total content of MgO, CaO, SrO, and BaO is preferably higher than 0%, and even preferably 0.5% or higher.

In the case where the glass plate contains ZnO, from the viewpoint of increasing the solubility of glass materials, the content of ZnO is preferably higher than 0%, and even preferably 0.5% or higher.

From the viewpoint of preventing an event that the light guide plate is damaged during transport, the thickness of the glass plate is preferably 0.1 mm or larger, and even preferably 0.2 mm or larger. From the viewpoint of decreasing the weight of the glass plate, the thickness of the glass plate is preferably 3 mm or smaller, even preferably 1 mm or smaller, and further preferably 0.5 mm or smaller.

[Production Method of Light Guide Plate]

Although an example of a production method of a light guide plate according to the embodiment will be described below, the production method is not limited thereto.

The production method of a light guide plate includes a step of forming a resin layer on a major surface of a glass plate having a desired composition.

The glass plate may be either a glass plate on the market or a glass plate obtained by melting materials so as to obtain a desired composition and then shaping it into a plate shape. Conventional methods may be used to melt and shape a glass plate.

It is preferable that a major surface of the glass plate be polished. The parallelism of the glass plate can be reduced and its surface roughness can be decreased by polishing it. As a result, its haze value is decreased and an optical path taken by a light beam can be reduced in distortion.

Before forming the resin layer on a major surface of the glass plate, the surface of the glass plate may be subjected to a surface treatment using a silane coupling agent or the like to increase the adhesion between the glass plate and the resin layer. In the case of performing the surface treatment, a buffer layer of a film-formable material such as $SiO_2$ may be formed, a surface treatment may be performed thereon, and then, the resin layer may be formed.

The resin layer is made of a resin in which metal oxide fine particles are dispersed, and a known method can be used to disperse metal oxide fine particles in the resin. For example, it is preferable to perform mixing using a solvent in which metal oxide fine particles whose surfaces are coated with an organic substance (hereinafter sometimes referred to as "coated metal oxide fine particles") are dispersed and a resin component is dissolved.

The resin layer may be formed on at least one major surface of the glass plate. The resin layer may be formed on either the entire major surface or only in a certain region of the major surface. In the case where the resin layer is to serve as a diffraction portion, it is preferable to form a resin layer in the entire region or at least a region where to form a diffraction portion of at least one major surface of the glass plate, and perform imprinting using a die so as to form an input diffraction grating portion or an output diffraction grating portion (i.e., to form a diffraction grating structure by transfer).

For another example, a resin in which metal oxide fine particles are dispersed may be applied in lines on a major surface of the glass plate by screen printing, gravure printing, a method using a dispenser, ink jetting, or the like. After such a resin is applied to the major surface of the glass plate, it may be cured while stripe shapes are formed. For a further example, a resin film having a diffraction grating structure may be formed in advance and then stuck to a major surface of the glass plate.

A volume hologram made up of a resin layer may be formed by a conventional method at a position where to form a diffraction portion.

After the formation of the resin layer, a protection layer may be formed so as to cover the resin layer, in particular, a portion to serve as a diffraction portion, of the resin layer. A cover may also be provided.

[Video Display Device]

A video display device according to the embodiment is provided with the above-described light guide plate, and is preferably an HMD and even preferably an HMD for AR.

FIG. 1 illustrates an example of a video display device. As illustrated in FIG. 1, a light guide plate 13 of a video display device 10 is equipped with a resin layer 15 on at least one major surface of a glass plate 14 and is also equipped with an input diffraction grating portion 16A and an output diffraction grating portion 16B as at least portions of the resin layer 15. Each of the diffraction portions 16A and 16B may be a diffraction optical element or a volume hologram element, and preferably a diffraction optical element.

Image light that is emitted from an image light generation unit 11 enters in the diffraction portion 16A of the light guide plate 13 via a lens 12. The incident image light is diffracted by the diffraction portion 16A and input to the glass plate 14 which is a substrate of the light guide plate. The image light that has been input to the glass plate 14 is subjected to total reflection inside the glass plate 14 and enters in the diffraction portion 16B. The image light that has entered on the diffraction portion 16B is diffracted by the diffraction portion 16B, exits from the light guide plate 13, and is observed by an observer 17. The observer 17 sees transmission light as an external scene in addition to the image light that is output from the image light generation unit 11.

The video display device may include such components as an electronic circuit and a power source in addition to the above components.

A preferable mode of the light guide plate of a video display device is the same as the one described in the above "Video display device" section, and the diffraction portions is preferably provided in a resin layer. The configuration, other than the light guide plate, of a video display device can be the same as the corresponding part of a conventional device.

In the case of an HMD, it is preferable that the portion, to serve as a diffraction portion, of the resin layer be formed by stacking layers that diffract R light, G light, and B light in respective wavelength ranges in the RGB color system.

EXAMPLES

Although the present invention will be described below in a specific manner with reference to test examples, the present invention is not limited to them.

Example 1

A glass plate A measuring 40 mm×60 mm×0.5 mm (thickness) was used and a resin layer a was formed on one major surface. The glass plate A had a composition shown in Table 1.

The resin layer a was formed by applying, to a major surface of the glass plate A, a solution obtained by mixing together 12.8 g of an organic substance-coated zirconium oxide fine particles dispersion liquid ("ZP-153-A", produced by Nippon Shokubai Co., Ltd., zirconium average particle diameter: 11 nm, concentration of solid components: 70%), 0.5 g of ethoxylated bisphenol A diacrylate (NK-ester "ABE-300", produced by Shin-Nakamura Chemical Co., Ltd.), 0.5 g of ethoxylated o-phenyl phenol acrylate (NK-ester "A-LEN-10", produced by Shin-Nakamura Chemical Co., Ltd.), 0.1 g of a photopolymerization initiator ("Omnirad 1173", produced by IGM Resins B.V.), and 0.05 g of a fluorine surfactant ("Surflon S-243", produced by AGC Seimi Chemical Co., Ltd.), and baking the resultant at 80° C. for 5 minutes. Subsequently, a die having an uneven shape in which a bump/dip height difference was 100 nm and a bump/dip interval was 445 nm was pressed against a portion of the surface of the resin layer and the resin layer was set by irradiating it with ultraviolet light having a wavelength 365 nm at an illuminance of 50 mW/cm² for 1 minute from the glass plate side. The die was then released, whereby a light guide plate having a diffraction grating structure in the surface was obtained. The content of coated metal oxide fine particles in the resin layer a was 89 mass % and the thickness of the resin layer in the region where the diffraction portion was not formed was 1,000 nm.

Empty boxes in the glass composition columns in Table 1 indicate that a content was lower than a detection limit value.

Example 2

A glass plate B having a composition shown in Table 1 was used in place of the glass plate A.

To form a resin layer b, a solution obtained by mixing together 4 g of an organic substance-coated zirconium oxide fine particles dispersion resin composition ("HR-101", produced by Nippon Shokubai Co., Ltd., zirconium average particle diameter: 11 nm), 0.04 g of a photopolymerization initiator ("Omnirad 1173", produced by IGM Resins B.V.), and 0.02 g of a fluorine surfactant ("Surflon S-243", produced by AGC Seimi Chemical Co., Ltd.) was applied to a major surface of the glass plate B. Subsequently, a die having an uneven shape in which a bump/dip height difference was 100 nm and a bump/dip interval was 445 nm was pressed against a portion of the surface of the resin layer and the resin layer was set by irradiating it with ultraviolet light having a wavelength 365 nm at an illuminance of 50 mW/cm² for 1 minute from the glass plate side. The die was then released, whereby a light guide plate having a diffraction grating structure in the surface was obtained. The content of coated metal oxide fine particles in the resin layer b was 79 mass % and the thickness of the resin layer in the region where the diffraction portion was not formed was 1,000 nm.

Example 3

A glass plate C having a composition shown in Table 1 was used in place of the glass plate A.

A resin layer c was formed by applying, to a major surface of the glass plate C, a solution obtained by mixing 7 g of a titanium oxide fine particles dispersion liquid ("OPTO-LAKE 6320Z", produced by JGC Catalysts and Chemicals Ltd., average particle diameter: 13 nm, concentration of solid components: 20 mass %), 0.05 g of ethoxylated bisphenol A diacrylate (NK-ester "ABE-300", produced by Shin-Nakamura Chemical Co., Ltd.), 0.05 g of ethoxylated o-phenyl phenol acrylate (NK-ester "A-LEN-10", produced by Shin-Nakamura Chemical Co., Ltd.), 0.02 g of a photopolymerization initiator ("Omnirad 1173", produced by IGM Resins B.V.), and 0.01 g of a fluorine surfactant ("Surflon S-243", produced by AGC Seimi Chemical Co., Ltd.), and baking the resultant at 80° C. for 5 minutes. Subsequently, a die having an uneven shape in which a bump/dip height difference was 100 nm and a bump/dip interval was 445 nm was pressed against a portion of the surface of the resin layer and the resin layer was set by irradiating it with ultraviolet light having a wavelength 365 nm at an illuminance of 50 mW/cm² for 1 minute from the glass plate side. The die was then released and the resin layer c was heated at 150° C. for 1 hour in the air, whereby a light guide plate having a diffraction grating structure in the surface was obtained. The content of coated metal oxide fine particles in the resin layer c was 92 mass % and the thickness of the resin layer in the region where the diffraction portion was not formed was 1,000 nm.

Example 4

A glass plate D having a composition shown in Table 1 was used in place of the glass plate A.

A resin layer d was formed by applying, to a major surface of the glass plate D, a solution obtained by mixing 7 g of a titanium oxide fine particles dispersion liquid ("OPTO-LAKE 6320Z", produced by JGC Catalysts and Chemicals Ltd., average particle diameter: 13 nm, concentration of solid components: 20 mass %), 0.3 g of ethoxylated bisphenol A diacrylate (NK-ester "ABE-300", produced by Shin-Nakamura Chemical Co., Ltd.), 0.3 g of ethoxylated o-phenyl phenol acrylate (NK-ester "A-LEN-10", produced by Shin-Nakamura Chemical Co., Ltd.), 0.02 g of a photopolymerization initiator ("Omnirad 1173", produced by IGM Resins B.V.), and 0.01 g of a fluorine surfactant ("Surflon S-243", produced by AGC Seimi Chemical Co., Ltd.), and baking the resultant at 80° C. for 5 minutes. Subsequently, a die having an uneven shape in which a bump/dip height difference was 100 nm and a bump/dip interval was 445 nm was pressed against a portion of the surface of the resin layer and the resin layer was set by irradiating it with ultraviolet light having a wavelength 365 nm at an illuminance of 50 mW/cm² for 1 minute from the glass plate side. The die was then released, whereby a light guide plate having a diffraction grating structure in the surface was obtained. The content of coated metal oxide fine particles in the resin layer d was 69 mass % and the thickness of the resin layer in the region where the diffraction portion was not formed was 1,000 nm.

Example 5

A light guide plate was obtained in the same manner as in Example 4 except that the resin layer d was replaced by the resin layer b of Example 2. The thickness of the resin layer in the region where the diffraction portion was not formed was 1,000 nm.

Although in Examples 1-5 the resin layer was formed by adding a fluorine surfactant, it was confirmed that light guide plates can be produced by similar methods even without adding a fluorine surfactant.

(Refractive Index: Resin Layer)

As for a refractive index of a resin layer, refractive indices were measured at wavelengths 473 nm, 594 nm, and 658 nm by using a refractive index measuring instrument (prism coupler "2010/M", produced by Metricon Corporation (U.S.)), and refractive indices for the d-line (wavelength 587.56 nm), the F-line (wavelength: 486.13 nm) and the C-line (wavelength: 656.27 nm), and refractive indices at intervals of 1 nm over the entire range of a wavelength of 400 nm to 800 nm were calculated by using "Metricon Fit" that was attached to the above instrument.

Figure 2:
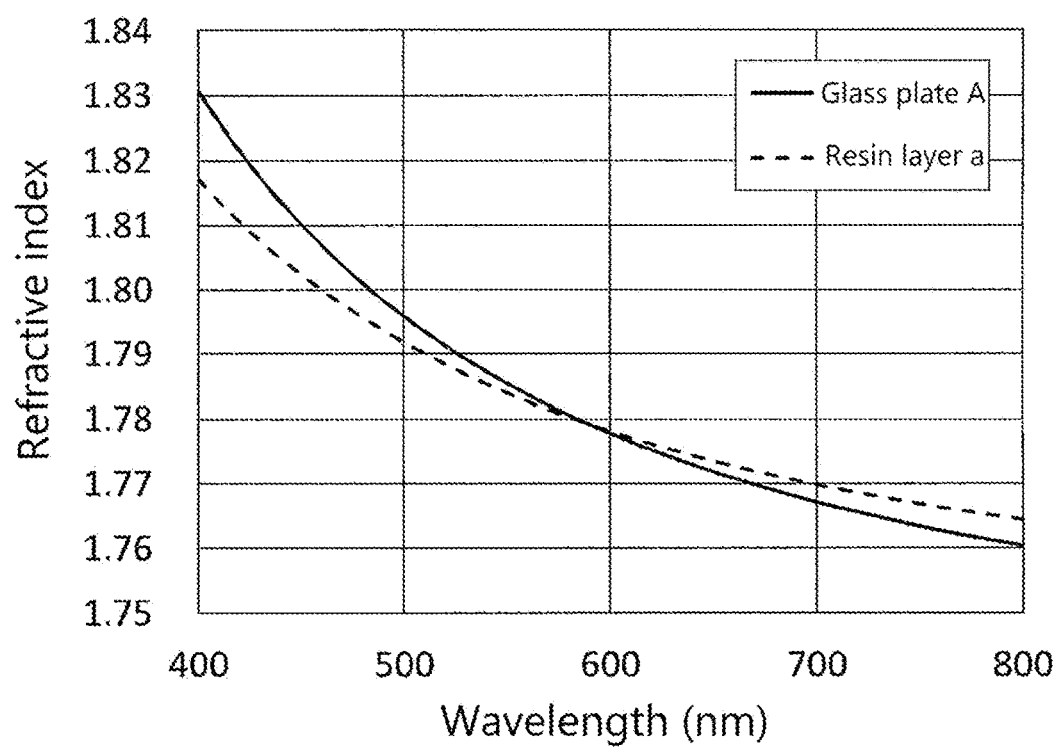
FIG. 2 shows refractive index spectra with respect to wavelength, of a glass plate and a resin layer of the light guide plate of Example 1.

Refractive index spectra with respect to the wavelength of the glass plate A and the resin layer a of the light guide plate of Example 1 are shown in FIG. 2 as examples.

Refractive index differences between the glass plate and the resin layer were determined at intervals of 1 nm and a maximum absolute value of refractive index differences was determined in each of wavelength ranges 430 nm to 700 nm, 430 nm to 750 nm, 400 nm to 750 nm, 430 nm to 800 nm,

TABLE 1

|  | Glass plate |  | A | B | C | D |
|---|---|---|---|---|---|---|
| Glass composition (mol %) | SiO₂ |  | 56.3 | 5.8 | 14.6 |  |
|  | B₂O₃ |  | 0.5 | 65.7 | 24.5 | 9.8 |
|  | BaO |  |  |  |  | 0.8 |
|  | Li₂O |  | 10.0 |  |  | 21.2 |
|  | Na₂O |  | 6.9 |  |  | 4.4 |
|  | K₂O |  | 4.6 |  |  | 5.5 |
|  | Refractive index-increasing components | Y₂O₃ |  | 2.4 | 4.0 |  |
|  |  | TiO₂ |  |  | 24.0 | 5.3 |
|  |  | Ta₂O₅ |  |  |  |  |
|  |  | WO₃ |  |  | 0.2 | 5.8 |
|  |  | Nb₂O₅ | 18.7 |  | 4.0 | 16.4 |
|  |  | La₂O₃ |  | 16.6 | 22.7 |  |
|  |  | ZrO₂ | 3.0 |  | 6.0 |  |
|  |  | Bi₂O₃ |  |  |  | 4.6 |
|  |  | Gd₂O₃ |  | 9.5 |  |  |
|  | P₂O₅ |  |  |  |  | 26.2 |
|  | Total |  | 100.0 | 100.0 | 100.0 | 100.0 |
| (1) La₂O₃ + Gd₂O₃ + Y₂O₃ + ZrO₂ + Ta₂O₅ |  |  | 3.0 | 28.5 | 32.7 | 0.0 |
| (2) TiO₂ + Bi₂O₃ |  |  | 0.0 | 0.0 | 24.0 | 9.9 |
| (3) La₂O₃ + Gd₂O₃ + Y₂O₃ + ZrO₂ + Ta₂O₅ + WO₃ + Nb₂O₅ + TiO₂ + Bi₂O₃ |  |  | 21.7 | 28.5 | 60.9 | 32.1 |
| SiO₂ + B₂O₃ + P₂O₅ |  |  | 56.8 | 71.5 | 39.1 | 36.0 |
| Li₂O + Na₂O + K₂O |  |  | 21.5 | 0.0 | 0.0 | 31.1 |
| MgO + CaO + SrO + BaO |  |  | 0.0 | 0.0 | 0.0 | 0.8 |
| (1)/(3) |  |  | 0.138 | 1.000 | 0.537 | 0.000 |
| (2)/(3) |  |  | 0.000 | 0.000 | 0.394 | 0.309 |
| d-line refractive index $n_d(G)$ |  |  | 1.78 | 1.75 | 1.96 | 1.82 |
| Abbe number $v_d$ |  |  | 28 | 53 | 30 | 24 |

[Evaluation Methods]

Following evaluations were performed on a light guide plate and a glass plate and a resin layer of the light guide plate. Examples 1-4 are Inventive Examples and Example 5 is Comparative Example.

(Refractive Index: Glass Plate)

As for a refractive index of a glass plate, refractive indices of a sample worked so as to have a cuboid shape measuring 5 mm or larger in side lengths and 5 mm or larger in thickness were measured at intervals of 1 nm over the entire range of a wavelength of 400 nm to 800 nm by using a precision refractive index meter (type "KPR-200" or "KPR-2000", produced by Shimadzu Corporation). Refractive indices of a glass plate were values that were measured directly before the formation of a resin layer on its major surface.

and 400 nm to 800 nm. The maximum values thus obtained in the respective wavelength ranges are shown in Table 2 as "Maximum refractive index differences." Also shown in Table 2 are d-line refractive indices ($n_d(G)$ and $n_d(R)$) of each glass plate and each resin layer.

(Abbe Number)

Abbe numbers of each glass plate and each resin layer were calculated according to an equation $v_d=(n_d-1)/(n_F-n_C)$ using the refractive indices $n_d$, $n_F$, and $n_C$ for the d-line (wavelength 587.56 nm), the F-line (wavelength: 486.13 nm) and the C-line (wavelength: 656.27 nm), determined by the above refractive index measuring method. Obtained values are shown in Table 2.

(Normal Transmittance)

Figure 3:
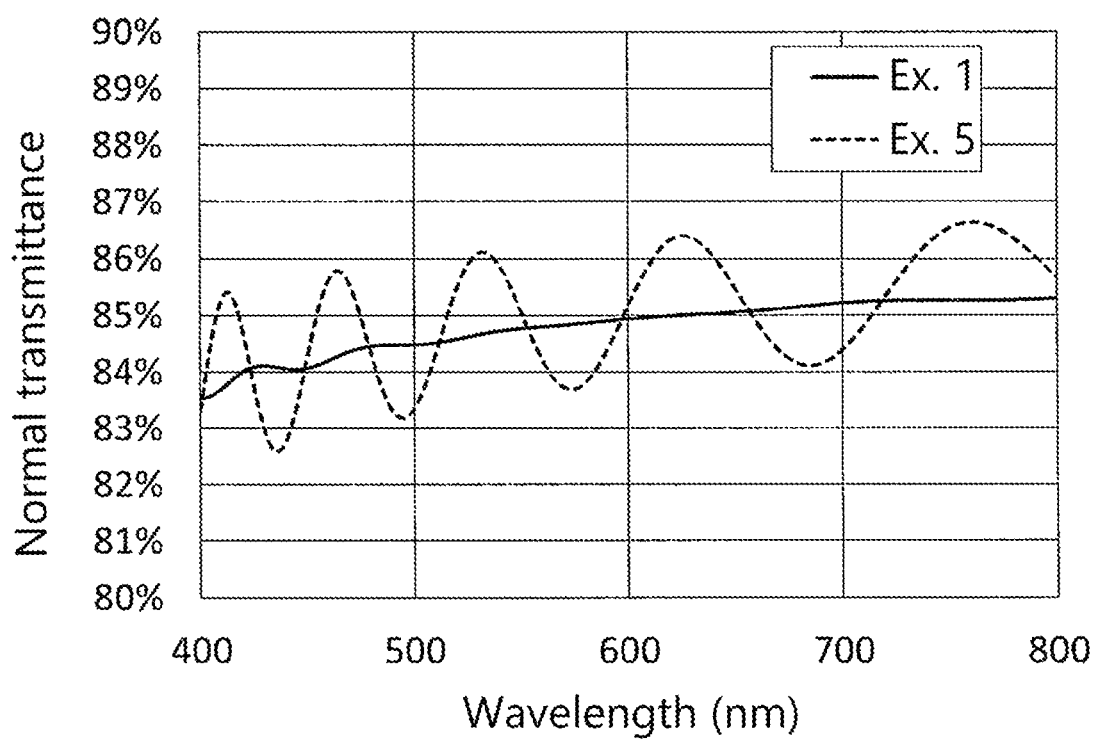
FIG. 3 shows normal transmittance spectra with respect to wavelength, of the light guide plates of Examples 1 and 5.

Normal transmittance values of each light guide plate were measured by using a spectrophotometer (type "U-4100", produced by Hitachi High-Tech Corporation) at intervals of 1 nm over the entire range of a wavelength of 400 nm to 800 nm. Normal transmittance spectra with respect to the wavelength of the light guide plates of Examples 1 and 5 are shown in FIG. 3 as examples.

A maximum value and a minimum value of normal transmittance values were determined in each of wavelength ranges 430 nm to 700 nm, 430 nm to 750 nm, 400 nm to 750 nm, 430 nm to 800 nm, and 400 nm to 800 nm and the difference between the maximum value and the minimum value was determined. The difference between the maximum value and the minimum value of the normal transmittance values are shown in Table 2 as "Normal transmittance difference" in each wavelength range.

TABLE 2

| | | | Ex. 1 | Ex. 2 | Ex. 3 | Ex. 4 | Ex. 5 |
|---|---|---|---|---|---|---|---|
| Light guide plate | Glass plate | Kind of glass plate | A | B | C | D | D |
| | | d-line refractive index $n_d(G)$ | 1.78 | 1.75 | 1.96 | 1.82 | 1.82 |
| | | Abbe number $v_d(G)$ | 28 | 53 | 30 | 24 | 24 |
| | Resin layer | Resin layer | a | b | c | d | b |
| | | Metal oxide fine particles component and content (mass %) | $ZrO_2$ 89% | $ZrO_2$ 79% | $TiO_2$ 92% | $TiO_2$ 69% | $ZrO_2$ 79% |
| | | d-line refractive index $n_d(R)$ | 1.78 | 1.72 | 1.96 | 1.82 | 1.72 |
| | | Abbe number $v_d(R)$ | 36 | 36 | 16 | 18 | 36 |
| | | Thickness d (nm) | 1,000 | 1,000 | 1,000 | 1,000 | 1,000 |
| | Maximum refractive index difference (430-700 nm) | | 0.01 | 0.03 | 0.05 | 0.02 | 0.12 |
| | Maximum refractive index difference (430-750 nm) | | 0.01 | 0.03 | 0.05 | 0.02 | 0.12 |
| | Maximum refractive index difference (400-750 nm) | | 0.01 | 0.03 | 0.07 | 0.03 | 0.13 |
| | Maximum refractive index difference (430-800 nm) | | 0.01 | 0.03 | 0.05 | 0.02 | 0.12 |
| | Maximum refractive index difference (400-800 nm) | | 0.01 | 0.03 | 0.07 | 0.03 | 0.13 |
| | Normal transmittance difference (430-700 nm) | | 1.2% | 1.3% | 3.0% | 2.0% | 3.8% |
| | Normal transmittance difference (430-750 nm) | | 1.2% | 1.5% | 3.0% | 2.1% | 4.0% |
| | Normal transmittance difference (400-750 nm) | | 1.7% | 1.5% | 3.9% | 3.0% | 4.0% |
| | Normal transmittance difference (430-800 nm) | | 1.3% | 1.5% | 3.0% | 2.3% | 4.0% |
| | Normal transmittance difference (400-800 nm) | | 1.8% | 1.5% | 3.9% | 3.2% | 4.0% |

As shown in FIG. 2, the absolute value of the refractive index difference between the glass plate and the resin layer was 0.07 or smaller at least in the entire range of the wavelength of 430 nm to 700 nm in each of Examples 1-4 and Examples 1-4 showed very similar refractive index dispersion spectra. On the other hand, in Example 5, the maximum value of the absolute values of the refractive index differences between the glass plate and the resin layer in the wavelength range 430 nm to 700 nm was as large as 0.12. As shown in FIG. 3, in Example 1, the variation of the normal transmittance with respect to the wavelength was small and no color deviations of transmission light were recognized. On the other hand, in Example 5, the variation of the normal transmittance with respect to the wavelength was large and color deviations of transmission light were recognized, that is, coloration occurred.

Although the present invention has been described above in detail with reference to the particular embodiments, it is apparent to those skilled in the art that various changes and modifications are possible without departing from the spirit and scope of the invention. The present application is based on Japanese Patent Application No. 2020-030808 filed on Feb. 26, 2020, the disclosure of which is incorporated herein by reference.

REFERENCE SIGNS LIST

10: Video display device
11: Image light generation unit
12: Lens
13: Light guide plate
14: Glass plate
15: Resin layer
16A, 16B: Diffraction portion
17: Observer

What is claimed is:

1. A light guide plate, comprising:
a glass plate; and
a resin layer formed on at least one surface of the glass plate,
wherein the resin layer includes a resin and metal oxide fine particles dispersed in the resin, an absolute value of a refractive index difference between the glass plate and the resin layer is 0.07 or smaller over an entire wavelength range of 430 nm to 700 nm, the glass plate has a glass composition that satisfies, in mol % in terms of oxides, $\{(La_2O_3+Gd_2O_3+Y_2O_3+ZrO_2+Ta_2O_5)/(La_2O_3+Gd_2O_3+Y_2O_3+ZrO_2+Ta_2O_5+WO_3+Nb_2O_5+TiO_2+Bi_2O_3)\} > 0.1$, and the metal oxide fine particles comprise at least one oxide selected from the group consisting of lanthanum oxide, gadolinium oxide, yttrium oxide, zirconium oxide, tantalum oxide, and hafnium oxide.

2. The light guide plate according to claim 1, wherein a difference between a maximum value and a minimum value of normal transmittance is 3.5% or smaller over the entire wavelength range of 430 nm to 700 nm.

3. The light guide plate according to claim 2, wherein the glass plate has a d-line refractive index $n_d(G)$ of 1.65 or larger, and the resin layer has a d-line refractive index $n_d(R)$ of 1.65 or larger.

4. The light guide plate according to claim 2, wherein the resin layer has a thickness d of 80 nm or larger.

5. The light guide plate according to claim 2, wherein the resin of the resin layer includes at least one resin selected from the group consisting of an ultraviolet-curable resin and a thermosetting resin.

6. The light guide plate according to claim 1, wherein the glass plate has a d-line refractive index $n_d(G)$ of 1.65 or larger, and the resin layer has a d-line refractive index $n_d(R)$ of 1.65 or larger.

7. The light guide plate according to claim 1, wherein the resin layer has a thickness d of 80 nm or larger.

8. The light guide plate according to claim 1, wherein the resin of the resin layer includes at least one resin selected from the group consisting of an ultraviolet-curable resin and a thermosetting resin.

9. The light guide plate according to claim 1, wherein the resin layer includes at least one of a lens, a lens array, and a diffraction portion.

10. A video display device, comprising: the light guide plate of claim 1.

11. A light guide plate, comprising:

a glass plate; and a resin layer formed on at least one surface of the glass plate, wherein the resin layer includes a resin and metal oxide fine particles dispersed in the resin, an absolute value of a refractive index difference between the glass plate and the resin layer is 0.07 or smaller over an entire wavelength range of 430 nm to 700 nm, the glass plate has a glass composition that satisfies, in mol % in terms of oxides, $\{(TiO_2+Bi_2O_3)/(La_2O_3+Gd_2O_3+Y_2O_3+ZrO_2+Ta_2O_5+WO_3+Nb_2O_5+TiO_2+Bi_2O_3)\}>0.1$, and the metal oxide fine particles comprise at least one oxide selected from the group consisting of titanium oxide and bismuth oxide.

12. The light guide plate according to claim 11, wherein a difference between a maximum value and a minimum value of normal transmittance is 3.5% or smaller over the entire wavelength range of 430 nm to 700 nm.

13. The light guide plate according to claim 12, wherein the glass plate has a d-line refractive index $n_d(G)$ of 1.65 or larger, and the resin layer has a d-line refractive index $n_d(R)$ of 1.65 or larger.

14. The light guide plate according to claim 12, wherein the resin layer has a thickness d of 80 nm or larger.

15. The light guide plate according to claim 12, wherein the resin of the resin layer includes at least one resin selected from the group consisting of an ultraviolet-curable resin and a thermosetting resin.

16. The light guide plate according to claim 11, wherein the glass plate has a d-line refractive index $n_d(G)$ of 1.65 or larger, and the resin layer has a d-line refractive index $n_d(R)$ of 1.65 or larger.

17. The light guide plate according to claim 11, wherein the resin layer has a thickness d of 80 nm or larger.

18. The light guide plate according to claim 11, wherein the resin of the resin layer includes at least one resin selected from the group consisting of an ultraviolet-curable resin and a thermosetting resin.

19. The light guide plate according to claim 11, wherein the resin layer includes at least one of a lens, a lens array, and a diffraction portion.

20. A video display device, comprising: the light guide plate of claim 11.

* * * * *